(12) United States Patent
Monden

(10) Patent No.: US 9,286,543 B2
(45) Date of Patent: Mar. 15, 2016

(54) CHARACTERISTIC POINT COORDINATION SYSTEM, CHARACTERISTIC POINT COORDINATION METHOD, AND RECORDING MEDIUM

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/239,111

(22) PCT Filed: Jul. 17, 2012

(86) PCT No.: PCT/JP2012/068544
§ 371 (c)(1),
(2), (4) Date: Feb. 14, 2014

(87) PCT Pub. No.: WO2013/024665
PCT Pub. Date: Feb. 21, 2013

(65) Prior Publication Data
US 2014/0212045 A1 Jul. 31, 2014

(30) Foreign Application Priority Data

Aug. 16, 2011 (JP) ................................ 2011-178029

(51) Int. Cl.
*G06K 9/46* (2006.01)
*G06K 9/62* (2006.01)
(52) U.S. Cl.
CPC ............ *G06K 9/6202* (2013.01); *G06K 9/6211* (2013.01); *G06K 2209/17* (2013.01)
(58) Field of Classification Search
None
See application file for complete search history.

(56) References Cited

U.S. PATENT DOCUMENTS 5,259,038 A * 11/1993 Sakou et al. .................. 382/158
5,774,130 A * 6/1998 Horikawa et al. ............. 345/441
6,094,507 A 7/2000 Monden
(Continued)

FOREIGN PATENT DOCUMENTS

| CA | 2232194 | 3/1998 |
| CN | 101127075 A | 2/2008 |
| DE | 69832314 | 3/2006 |

(Continued)

OTHER PUBLICATIONS

Hiroshi (Computer English Translation of Japanese Patent No. JP-10-261089 A), 1998.*

(Continued)

*Primary Examiner* — Daniel Mariam
(74) *Attorney, Agent, or Firm* — Wilmer Cutler Pickering Hale and Dorr LLP

(57) ABSTRACT

Provided is a characteristic point associating system including: a set creating unit to receive a plurality of characteristic point groups to be compared, and to create a plurality of characteristic point pair sets by grouping together characteristic point pairs that are close to one another in terms of local conversion parameter into sets; a set selecting unit to select a characteristic point pair set that contains many elements out of the plurality of characteristic point pair sets; and a corresponding characteristic point determining unit to determine out of characteristic point pairs contained in the selected characteristic point pair set, a pair of characteristic points to be associated with each other as correct corresponding characteristic points so as to be output. Thus, the characteristic point associating system associates correct pairing combinations of characteristic points that exist between the compared groups of characteristic points.

40 Claims, 12 Drawing Sheets

(56) References Cited

U.S. PATENT DOCUMENTS

| | | | |
|---|---|---|---|
| 8,885,048 B2 * | 11/2014 | Liu | 348/159 |
| 2006/0274920 A1 * | 12/2006 | Tochikubo et al. | 382/124 |

FOREIGN PATENT DOCUMENTS

| | | |
|---|---|---|
| EP | 0866424 | 9/1998 |
| JP | A-H-07-262375 | 10/1995 |
| JP | A-H10-261089 | 9/1998 |
| JP | 3002721 | 1/2000 |
| JP | 2002-298141 | 10/2002 |
| JP | 2006-065399 | 3/2006 |

OTHER PUBLICATIONS

International Search Report corresponding to PCT/JP2012/068544, dated Aug. 21, 2012; 3 pages.

Abstract of the Written Opinion corresponding to PCT/JP2012/068544, mailing date Sep. 4, 2012; 4 pages.

Chinese Office Action, Search Report with partial English translation corresponding to Chinese Application No. 201280039803.7, dated Sep. 6, 2015, 10 pages.

* cited by examiner (LEFT)　　　　　　　　　　(RIGHT)

|   | a | b | e | f |
|---|---|---|---|---|
| A | 12,2 | 15,2 | 10,-3 | 12,-3 |
| B | 9,2 | 12,2 | 7,-3 | 9,-3 |
| E | 12,5 | 15,5 | 10,0 | 12,0 |
| F | 10,5 | 13,5 | 8,0 | 10,0 |

FIG. 7

PARAMETER OF SET — CHARACTERISTIC POINT PAIR CONTAINED IN SET

SET 1 (12, 2)  {(A, a)}

FIG. 8

SET 1 (12, 2)  {(A, a), (B, b)}
SET 2 (15, 2)  {(A, b)}
SET 3 (10, 0)  {(E, e), (F, f)}
SET 4 (15, 5)  {(E, b)}

FIG. 9

CHARACTERISTIC POINT COORDINATION SYSTEM, CHARACTERISTIC POINT COORDINATION METHOD, AND RECORDING MEDIUM

CROSS-REFERENCE TO RELATED APPLICATIONS

This application is a national stage application of International Application No. PCT/JP2012/068544 entitled "Characteristic Point Coordination System, Characteristic Point Coordination Method, And Recording Medium" filed on Jul. 17, 2012, which claims the benefit of the priority of Japanese Patent Application No. 2011-178029, filed on Aug. 16, 2011, the disclosures of each of which are hereby incorporated by reference in their entirety.

TECHNICAL FIELD

This invention relates to a characteristic point associating system and a characteristic point associating method with which characteristic points that respectively belong to groups of characteristic points from two images or the like and that can be regarded as the same characteristic point are associated with each other in data analysis by information processing.

BACKGROUND ART

Various types of information can be obtained from images when identical characteristic points (places) in two images can be associated with each other. For instance, the three-dimensional shape of a subject can be obtained from two images by stereo matching with the use of corresponding characteristic points, which are characteristic points from two images that correspond to each other. Further, a change in a subject can be examined by using corresponding characteristic points to correct images so that subjects of the images overlap. The correction also makes it possible to check whether or not the subjects shot in two images are the same. Another way to obtain various types of information is to prepare in advance one of characteristic point groups to be compared as three-dimensional data and associate a group of characteristic points extracted from an image or a video with the prepared characteristic point group. This can be utilized in associating, for example, an actually shot satellite image or aerial image with map data. Similarly, this can be utilized in associating an image of a vehicle-mounted camera with car navigation data.

An example of this characteristic point associating method is a graphic form position detecting method described in Patent Literature 1. The method of Patent Literature 1 associates characteristic points from two images that are similar to each other in the arrangement of proximate characteristic points relative to a given characteristic point as corresponding characteristic point candidates, and obtains the distribution of a coordinate alignment parameter for overlapping the corresponding characteristic point candidates. A position where the coordinate alignment parameter is concentrated is used in subsequent processing as a coordinate alignment amount, which is equivalent to an image-to-image conversion parameter.

An image processing device described in Patent Literature 2 creates a set of images of a plurality of resolutions, and associates two images with each other by using a set of different-resolution images created for one image and a set of different-resolution images created for the other image. Images to be compared can thus be associated with each other even when one of the images is enlarged or reduced.

A pattern cross-check device described in Patent Literature 3 estimates a change in shape from the relation between corresponding characteristic point candidates so that graphic forms can be associated with each other despite a change in the shape of the subject.

CITATION LIST

Patent Literature 1: Japanese Patent No. 30132721
Patent Literature 2: JP-A-2006-065399
Patent Literature 3: JP-A-2002-298141

DISCLOSURE OF THE INVENTION

Problems to be Solved by the Invention

The technology of associating specific places in images or the like with each other by referring to a plurality of characteristic point groups as the technologies given above as examples is advanced further.

Some of problems of the technologies given above as examples are described.

One of problems of the technology described in Patent Literature 1 is that images to be compared cannot be associated with each other when a change in shape between the images is great or the arrangement partially differs between the images. This is because the technology associates characteristic points that are similar to each other in the arrangement of proximate characteristic points, extracts the associated points as corresponding characteristic point candidates, and obtains a coordinate alignment amount for overlapping the corresponding characteristic point candidates. The coordinate alignment amount for overlapping characteristic points in each pair of corresponding characteristic point candidates therefore varies from place to place when a change in the shape of the subject is great, or the arrangement differs partially and locally, between images. As a result, the coordinate alignment parameter is not concentrated and the correct position cannot be obtained.

Another problem of the method described in Patent Literature 1 is lengthy processing. The method of Patent Literature 1 first determines, for every pairing combination of characteristic points from two images, whether the pairing combination of characteristic points is to be treated as corresponding characteristic point candidates by using the arrangement of proximate characteristic points. Setting a strict standard for this determination improves the correspondence precision of corresponding characteristic points, which causes the distribution of a coordinate alignment parameter to concentrate on the correct value, and consequently facilitates the obtainment of a correct coordinate alignment amount.

However, making the determination strictly requires obtaining sufficient information from the arrangement of proximate characteristic points, which in turn requires expanding the range in which proximate characteristic points are obtained. Expanding the range of proximate characteristic points, on the other hand, increases information used for the determination and increases (prolongs) the amount (length) of processing necessary for the determination. In addition, the determination of corresponding characteristic point candidates is made for every pairing combination of characteristic points, which is a very large number. The number of times the determination is executed is consequently very large as well and, due to the lengthy processing time required for each determination session, the total processing time is extremely long. On the other hand, simplifying the determination processing in order to speed up the determination lowers the correspondence precision of corresponding characteristic point candidates, which leads to a failure in detecting correct corresponding characteristic points (a pair of characteristic points that are actually the same: a pair of characteristic points to remain included) and the inclusion of many wrong corresponding characteristic points (pairs of characteristic points that are actually not the same: pairs of characteristic points to be excluded) in corresponding characteristic point candidates. Then the coordinate alignment amount has a thinly spread distribution, which means that a correct coordinate alignment amount cannot be obtained.

Still another problem of the method of Patent Literature 1 is that processing of obtaining the distribution of a coordinate alignment amount for overlapping characteristic points in each pair of corresponding characteristic point candidates takes time as well. The coordinate alignment amount is a parameter for conversion for overlapping characteristic points in each pair of corresponding characteristic point candidates, and is obtained by, in the case of parallel shift, for example, examining the distribution of coordinate position differences of the respective pairs of corresponding characteristic point candidates in the lateral direction and the longitudinal direction each. The differences can take a very wide range of values and the need to scan every pair of corresponding characteristic point candidates under this condition prolongs the processing time. Setting a stricter standard for this feature stretches the processing time more as is the case for the determination of corresponding characteristic point candidates.

The technology described in Patent Literature 2 has a similar problem in that the technology is incapable of dealing with a great change in shape or a partially different arrangement. The reason is that a difference between images that is brought about by a great change in shape or a partially different arrangement cannot be absorbed by image enlargement or reduction. The method of Patent Literature 2, where image enlargement or reduction is dealt with by creating a multi-resolution image, is incapable of dealing with a change in shape or a partially different arrangement because image enlargement or reduction does not remove a change in shape or a partially different arrangement.

A problem of the technology described in Patent Literature 3 is that the technology is incapable of handling other changes in shape than an elastic, continuous, change in shape in the estimation of a change in shape in an image. The reason is that the subject is regarded as an elastic film in the estimation of a change in shape according to the method of Patent Literature 3. The method is therefore incapable of dealing with cases where the arrangement differs partially and uncontinuously between images.

This invention provides a characteristic point associating system that is capable of associating characteristic points with each other at a low processing amount even when the arrangement of a subject partially differs between compared groups of characteristic points.

Means to Solve the Problems

A characteristic point associating system according to one embodiment of this invention includes: a set creating unit to receive a plurality of characteristic point groups to be compared, and to create a plurality of characteristic point pair sets by grouping together characteristic point pairs that are close to one another in terms of local conversion parameter into sets; a set selecting unit to select a characteristic point pair set that contains many elements out of the plurality of characteristic point pair sets; and a corresponding characteristic point determining unit to determine out of characteristic point pairs contained in the selected characteristic point pair set, a pair of characteristic points to be associated with each other as correct corresponding characteristic points so as to be output.

Effect of the Invention

According to one embodiment of this invention, it is possible to provide the characteristic point associating system that is capable of associating the characteristic points with each other at a low processing amount even when the arrangement of the subject partially differs between the compared groups of characteristic points.

BRIEF DESCRIPTION OF THE DRAWINGS

FIG. 7 is an explanatory diagram illustrating a parameter for local conversion between the characteristic points of FIG. 6.

FIG. 8 is an explanatory diagram illustrating an example of a process of creating a set of characteristic point pairs.

FIG. 9 is an explanatory diagram illustrating an example of sets of characteristic point pairs.

MODE FOR EMBODYING THE INVENTION

Embodiments of this invention are described next in detail with reference to the drawings.

Figure 1:
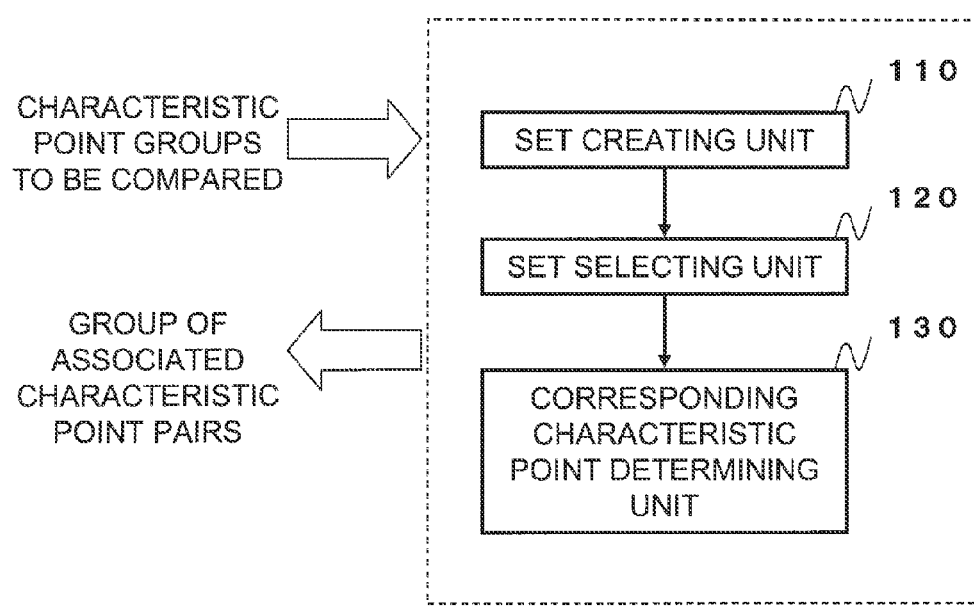
FIG. 1 is a block diagram illustrating a configuration according to a first embodiment of this invention.

Referring to FIG. 1, a characteristic point associating system of a first embodiment of this invention includes a set creating unit 110, a set selecting unit 120, and a corresponding characteristic point determining unit 130.

The set creating unit 110 receives a plurality of characteristic point groups to be compared and sets a plurality of characteristic point pair sets, which are each a set grouping together characteristic point pairs that are close to one another in terms of local conversion parameter. A characteristic point pair is a pair constituted of one characteristic point from one of characteristic point groups to be compared and one characteristic point from the other characteristic point group. A local conversion parameter is a parameter indicating a figure such as the value of a variable, a function, an algebraic expression, or the like that is required for individual conversion between characteristic points that constitute a characteristic point pair. In other words, a local conversion parameter is a parameter for converting one of two characteristic points that are paired into the other characteristic point.

The set selecting unit 120 selects a set that contains many elements out of a plurality of created sets.

The corresponding characteristic point determining unit 130 determines a characteristic point pair in which characteristic points out of elements contained in a selected set are associated with each other as correct corresponding characteristic points (corresponding characteristic points that are respectively taken out of characteristic point groups to be compared and that are regarded as the same). Determined characteristic point pairs are grouped so as to be output, and are used suitably.

With this configuration, characteristic point groups created for comparison by respectively collecting characteristic points from, for example, two images are received, and a characteristic point from one of the characteristic point groups and a characteristic point from the other characteristic point group that are regarded as the same are associated with each other and determined as corresponding characteristic points.

The obtained corresponding characteristic points are treated as characteristic points that indicate the same place in the two images in subsequent desired processing of various types.

Figure 2:
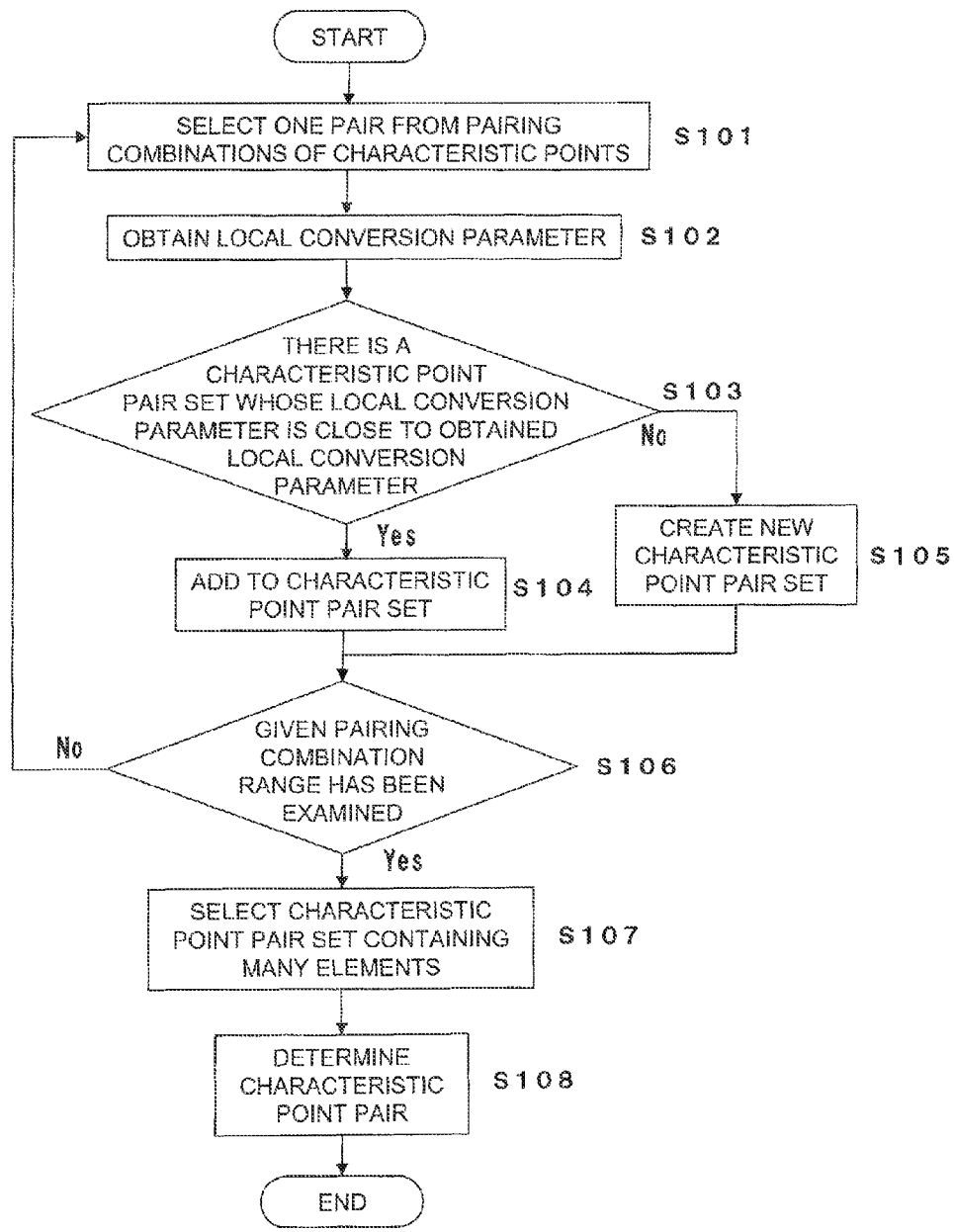
FIG. 2 is a flow chart illustrating an operation example according to the first embodiment of this invention.

An example of overall processing in this embodiment is described next in detail with reference to a flow chart of FIG. 2 and FIG. 1. The following description takes characteristic point groups of two images as an example.

The set creating unit 110 examines pairing combinations of characteristic points from the characteristic point groups of the two images, and sequentially creates sets of characteristic point pairs so that characteristic point pairs close to one another in terms of local conversion parameter belong to the same set. Processing thereof includes selecting one pairing combination from many pairing combinations of characteristic points (characteristic point pairs) from the two images (Step S101), and obtaining a local conversion parameter of the selected characteristic point pair (Step S102). Whether or not the obtained local conversion parameter is close to the local conversion parameter of one of characteristic point pair sets that have already been created is determined (Step S103) and, when such a characteristic point pair set is found, the selected characteristic point pair is added to this characteristic point pair set (Step S104). When there is no characteristic point pair set that meets the criterion, a new characteristic point pair set is created which has only the selected characteristic point pair as its element (Step S105). These operation steps are repeated while checking whether the processing has been finished for a given range of characteristic point pairing combinations (Step S106).

The set selecting unit 120 selects a set that contains many elements from among plurality of created sets (Step S107).

The corresponding characteristic point determining unit 130 determines corresponding characteristic points out of elements of the selected set to be treated as characteristic points from the two images that correspond to each other (Step S108).

The amount of processing is thus reduced by employing a routine for selecting corresponding characteristic points from among a characteristic point pair set which groups together characteristic point pairs close to one another in parameter.

A second embodiment of this invention is described next in detail with reference to the drawings.

Figure 3:
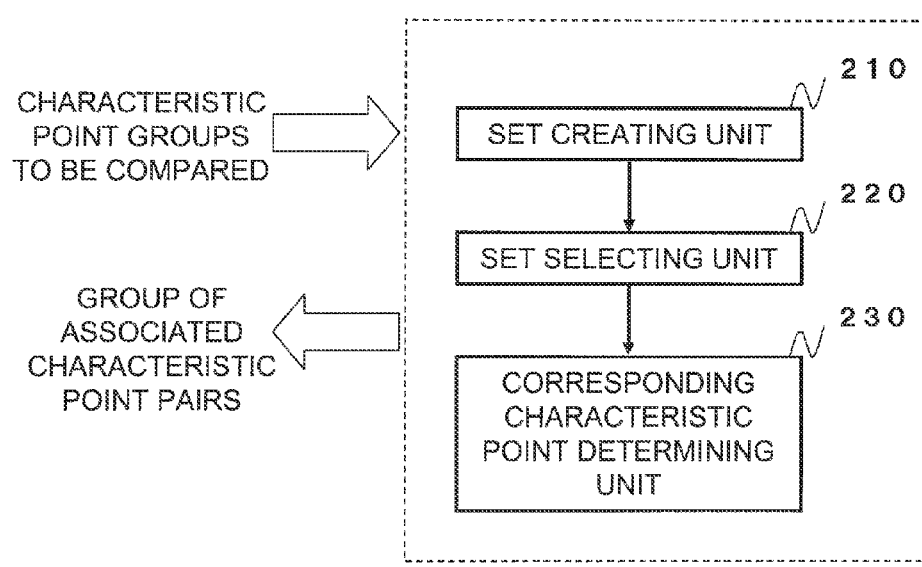
FIG. 3 is a block diagram illustrating a configuration according to a second embodiment of this invention.
Figure 4:
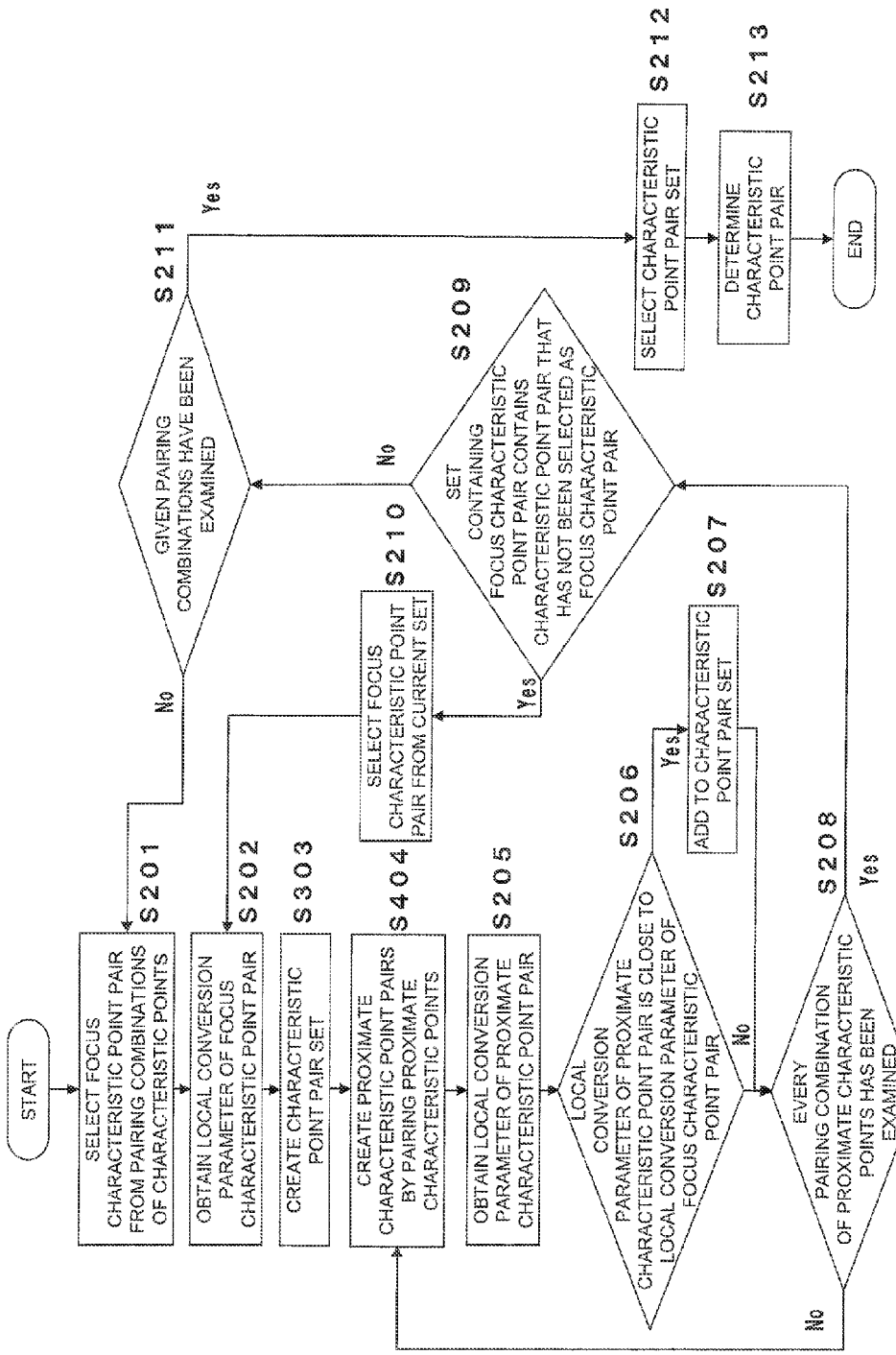
FIG. 4 is a flow chart illustrating an operation example according to the second embodiment of this invention.

As illustrated in FIGS. 3 and 4, the second embodiment differs from the first embodiment in the operation of the set creating unit. A description on points of the second embodiment, which are similar to the first embodiment, is simplified or omitted.

A set creating unit 210 selects from among characteristic point groups to be compared one pairing combination of characteristic points as a focus characteristic point pair (Step S201 of FIG. 4). A local conversion parameter is obtained for the selected focus characteristic point pair (Step S202). Thereafter, a characteristic point pair set is created that has as its element only the focus characteristic point pair for which the local conversion parameter has been obtained (Step S203). Next, characteristic points that are in the vicinity of the current focus characteristic point pair are selected from each of the characteristic point groups to be compared, and a proximate characteristic point pair is created which is a pair of characteristic points close to each other in terms of arrangement relative to the respective characteristic points constituting the focus characteristic point pair (Step S204). A local conversion parameter is obtained for the proximate characteristic point pair created (Step S205). Whether or not the local conversion parameter of the proximate characteristic point pair is close to the local conversion parameter of the focus characteristic point pair is determined (Step S206) and, when the parameters are close to each other, the proximate characteristic point pair is added to the set that contains the focus characteristic point pair (Step S207). These operation steps are executed until every pairing combination of proximate characteristic points of the focus characteristic point is processed (Step S208).

Whether the characteristic point pair set that contains the focus characteristic point pair has a characteristic point pair that has not been selected as a focus characteristic point pair yet is determined next (Step S209). When there is a characteristic point pair that meets the criterion, one characteristic point pair is selected out of characteristic point pairs that have not been selected as a focus characteristic point pair (Step S210), and the same processing (S202 to S208) is executed with the selected pair as a new focus characteristic point pair.

In the case where the set no longer contains a characteristic point that has not constituted a focus characteristic point pair, the same processing is executed for every pairing combination of characteristic points (S201 to S211). The processing includes selecting the next set and, when one of the already created sets contains a characteristic point pair that has not been selected as a focus characteristic point pair, the same processing is executed with this characteristic point pair as a focus characteristic point pair. In the case where no set contains a characteristic point pair that has not been selected as a focus characteristic point pair, and there is a characteristic point pair that has not been selected, the same processing is executed with this characteristic point pair as a focus characteristic point pair. This processing is repeated until there is no characteristic point pair left that has not been selected.

Thereafter, a set selecting unit 220 and a corresponding characteristic point determining unit 230 select a set that contains many elements out of the plurality of created sets (Step S212), and determine corresponding characteristic points from among elements of the selected set (Step S213).

The processing is thus reduced in amount and improved in precision with the use of the relative relation of a characteristic point and its proximate characteristic points by employing a routine for selecting one characteristic point pair as a representative, grouping together characteristic point pairs that are close to the selected characteristic point pair in parameter, and selecting corresponding characteristic points from the set of grouped characteristic point pairs.

EXAMPLE

The operation of the embodiments is described next with the use of concrete Examples.

An Example of this invention corresponding to the first embodiment of this invention is described. This Example is the application of this invention to a characteristic point associating system in a 3D map creating system that uses two satellite images or aerial images to create a 3D map.

This Example discusses associating characteristic points that are corners of a building or the like in two satellite images or aerial images having different image pickup angles, and thereby creating a 3D map that includes the height of the building or the like. The characteristic points can be extracted by various commonly-known methods, and have already been extracted here as characteristic point groups. Creating a 3D map based on the association between characteristic points by the principle of triangulation is also a widely known technology, and only the process up through the association of characteristic points is described here, while a description on processing that precedes and follows the process is omitted.

The following description is given with reference to schematic views illustrating characteristic point groups.

Figure 5:
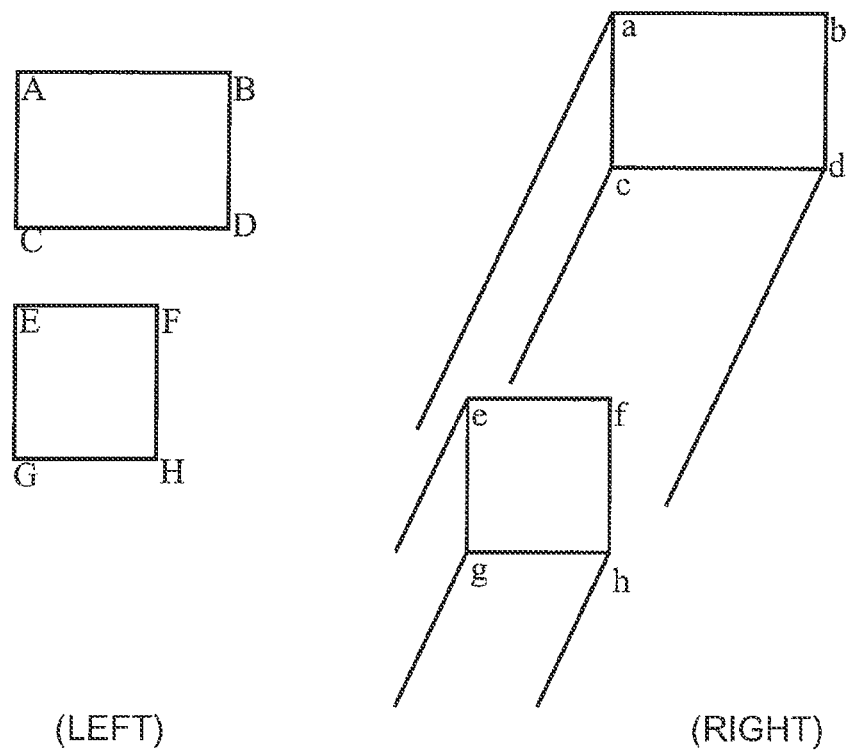
FIG. 5 is a schematic view illustrating an example of processing target images according to Example 1 of this invention.

The left half of FIG. 5 is a schematic view of an image in which two buildings are shot from directly above. The right half of FIG. 5 is a schematic view in which the two buildings are shot at an angle. From each building, four corners where the edges of the building meet are extracted as characteristic points, which are denoted by A to H and by a to h. The uppercase and lowercase of the same letter, such as "A" and "a" or "B" and "b", are characteristic points that are the same in the left image and the right image (the same place: characteristic points to be associated with each other).

Figure 6:
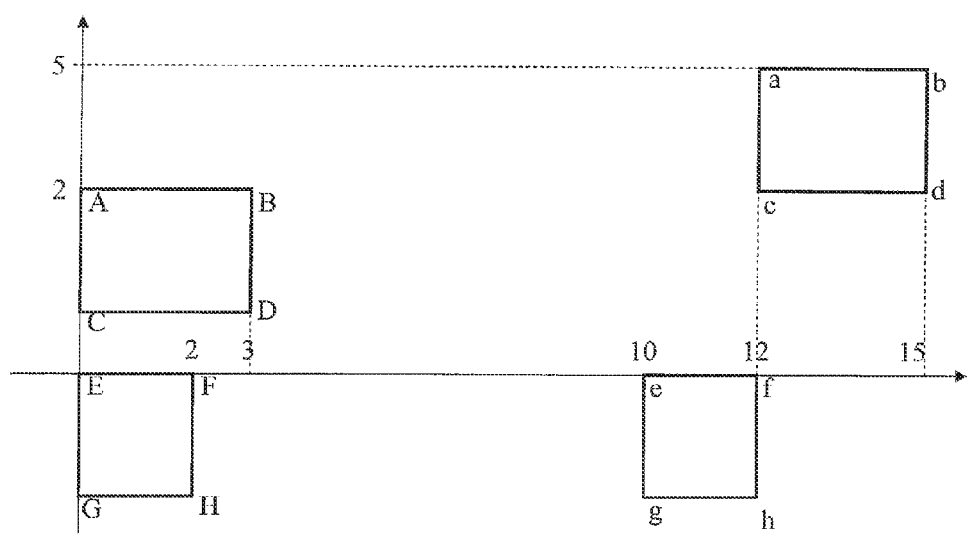
FIG. 6 is an explanatory diagram illustrating a positional relation between characteristic points of FIG. 5.

FIG. 6 illustrates the coordinate position of each characteristic point of FIG. 5. Identical characteristic points have different coordinate values because the buildings are not shot from exactly the same position. It is therefore necessary to obtain a parameter of parallel shift and/or rotation for overlapping two characteristic points.

Further, the positional relation between ABCD and EFGH and the positional relation between abcd and efgh differ in the left image and the right image due to different directions in which the buildings are shot. In other words, whichever building is used as the reference, the arrangement of the other shot building differs between the images, and the subject arrangement partially differs between the images. The characteristic points therefore do not overlap with each other through the rotation and/or parallel shift of the two images. Accordingly, local association between these two images is not accomplished and characteristic points cannot be associated properly with each other by the method of Patent Literature 1.

The description given here is simplified by treating rotation between the two images as unnecessary and describing only a parallel shift with regard to the coordinate alignment amount (local conversion parameter value) of each characteristic point pair. The description also uses only upper characteristic points (ABEF and abef) of the respective buildings in the drawings.

FIG. 7 illustrates local conversion parameters (parallel shift amounts) for aligning coordinates for pairing combinations of characteristic points from two images. Processing of obtaining the value of a parameter by plotting characteristic point groups of two images onto the same coordinate system is performed in this description. Alternatively, the value of a parameter may be determined by handling characteristic point groups so that the characteristic point groups overlap. Other methods may also be used to determine the value of a parameter.

The set creating unit 110 examines pairing combinations of characteristic points from the two images, and creates a plurality of grouped sets of characteristic point pairs by grouping the characteristic point pairs so that characteristic point pairs close to one another in terms of local conversion parameter belong to the same set.

First, one characteristic point pair such as (A, a) is selected out of pairing combinations of characteristic points from the two images. A local conversion parameter is obtained next for the selected characteristic point pair. In the case of (A, a), "A" and "a" overlap when "A" is moved rightward by 12 and upward by 2 through parallel shift. The local conversion parameter of (A, a) is therefore (12, 2).

When the obtained local conversion parameter is close to the local conversion parameter of one of characteristic point pair sets that have already been created, the selected characteristic point pair is added to this characteristic point pair set. In the case where the obtained parameter is not close to the parameter of any existing set, a new characteristic point pair set is created that contains only the selected characteristic point pair as its element.

Because (A, a) is the first selected characteristic point pair, no characteristic point pair set has been created yet. The set creating unit 110 therefore performs processing of creating, as a new characteristic point pair set, a set 1 which has the local conversion parameter (12, 2) and associating the characteristic point pair (A, a) as an element of the set 1 as illustrated in FIG. 8. This processing corresponds to a processing routine from Step S101 to Step S106 of FIG. 2 that goes through Step S105.

After one characteristic point pair is processed, the next characteristic point pair is selected to repeat the same processing.

For instance, (A, b) is selected next. The local conversion parameter of this characteristic point pair is (15, 2). In this Example, the standard for determining whether local conversion parameters are close to each other is whether the local conversion parameters are a complete match in order to simplify the description. Therefore, because the just obtained local conversion parameter (15, 2) does not match the local conversion parameter of the already created set 1, the set creating unit 110 creates a set 2 which has the local conversion parameter (15, 2) as a new characteristic point pair set, and puts the characteristic point pair (A, b) as an element of the set 2.

When (B, b) is selected next, the local conversion parameter of this characteristic point pair is (12, 2) and matches that of the set 1. The set creating unit 110 therefore adds (B, b) to the set 1. This processing corresponds to a processing routine from Step S101 to S106 of FIG. 2 that goes through Step S104.

Similarly, when (E, e) is selected, the local conversion parameter of this characteristic point pair is (10, 0) and differs from the local conversion parameters of the set 1 and the set 2 which are characteristic point pair sets that have been created. A set 3 which has the local conversion parameter (10, 0) is therefore created as a new characteristic point pair set, and the characteristic point pair (E, e) is put as an element of the set 3.

Similarly, when (F, f) is selected, the local conversion parameter of this characteristic point pair is (10, 0) and matches that of the set 3. The characteristic point pair (F, f) is therefore added to the set 3.

Similarly, when (E, b)) is selected, the local conversion parameter of this characteristic point pair is (15, 5) and differs from the local conversion parameters of the characteristic point pair sets that have been created. A set 4 which has the local conversion parameter (15, 5) is therefore created as a new characteristic point pair set, and the characteristic point pair (E, b) is put as an element of the set 4.

The set creating unit 110 repeats these operation steps within a given range of pairing combinations of characteristic points. Here, the operation steps are repeated for every pairing combination of characteristic points. Alternatively, characteristic point pairs that are close to one another in terms of local conversion parameter may be grouped into a set after obtaining a local conversion parameter for every characteristic point pair first.

In the method of Patent Literature 1, an information processing device performs, for every pairing combination of characteristic points, processing of determining whether proximate characteristic points thereof resemble to each other in terms of arrangement. When the average count of proximate characteristic points of one characteristic point is ten, for example, the search for and comparison of proximate characteristic points need to be executed 10×10 times. Performing this processing for every pairing combination of characteristic points means that the amount of calculation increases exponentially in proportion to the count of characteristic points. In this Example, on the other hand, merely the calculation of one local conversion parameter is executed for one pairing combination of characteristic points. This Example where merely two parameters of the parallel shift amount are obtained only needs to calculate twice. Processing performed on every pairing combination of characteristic points is thus very simple in this Example, and high-speed processing is therefore accomplished.

Once the characteristic point pair sets are created, the set selecting unit 20 selects a set that contains many elements from among the plurality of created sets. FIG. 9 illustrates some of the characteristic point pair sets created. The set 1 and the set 3 which are sets having an element count of 2 or more are selected here.

When a local conversion parameter is obtained for every pairing combination of characteristic points, pairing combinations of characteristic points of similar changes in shape or similar partial arrangement differences have the same parameter value, and a large number of elements gather in a set of correct pairing combinations. On the other hand, various values are output as the local conversion parameters of pairing combinations of characteristic points that do not represent the same place. The element count of a set that has such local conversion parameters is 1 or less. Whether a set contains pairing combinations of identical characteristic points, namely, correct characteristic point pairs, can accordingly be determined by whether the count of contained elements is high or low.

With the method of Patent Literature 1, all values that a conversion parameter can take need to be examined in order to obtain the distribution of a coordinate alignment amount. In the case where the image size is 100 pixels by 100 pixels, for example, the general range of values that the parallel shift amount can take is approximately 200 in the lateral direction (from −100 to +100) and approximately 200 in the longitudinal direction (from −100 to +100), which amounts to approximately 40,000 in total. A position where the distribution is concentrated needs to be found from the approximately 40,000 values. The range of the search could be narrowed by setting a certain range as the unit of obtaining the distribution of the parallel shift amount. For instance, breaking the shift amount into units of 10 and treating +1 to +10 as the same value reduces the range of the search to 20 long by 20 across, 400 in total. However, the precision of the coordinate alignment amount obtained in this case is in the units of 10 pixels, which is considerably low.

This Example only needs to examine as many values as the count of characteristic point pair sets created. The count of characteristic points is usually lower than the count of possible local conversion parameter types, and the selection in this Example is therefore done much more quickly than in the method of Patent Literature 1.

After sets that have a high element count are extracted, the corresponding characteristic point determining unit 130 determines corresponding characteristic points out of elements of the selected sets. Here, all characteristic point pairs contained in the selected sets are determined as corresponding characteristic point pairs.

This processing is followed by processing of creating a 3D map based on the association between characteristic points of the two images with the use of the determined corresponding characteristic point pair group.

While this Example has described the application of this invention to a characteristic point associating system in a 3D map creating system that uses two satellite images or aerial images as input images to be compared in creating a 3D map, this invention is applicable to any system that uses the association of characteristic points from two images.

While this Example has discussed a case where images do not need to be rotated and only parallel shift is considered in obtaining the value of a local conversion parameter, this invention is capable of dealing with the rotation of images by including rotation among local conversion parameters. Similarly, this invention can deal with a desired change by adding other parameter elements (enlargement/reduction, a pattern change, and the like) as the value of a real number, a function, a vector, or the like that is required for conversion between characteristic points paired as a characteristic point pair. With such parameters, an advertising balloon on the roof, crossing bars at a railroad crossing, and the like can be determined efficiently as correct characteristic point pairs as well. The processing amount in this invention is still smaller than in similar existing methods even when parameter elements used are increased in this manner.

The standard for determining that local conversion parameters are close to each other is a complete match in this Example in order to simplify the description. Normally, however, it is rare that local conversion parameters match completely due to errors or the like. This can be dealt with by setting the standard as "the difference is within a given range." The local conversion parameter of a set in this case may be fixed to the local conversion parameter of the first selected characteristic point pair, or may be the average or barycenter of local conversion parameters of elements within the set that is calculated each time a new element is added to the set.

The range of pairing combinations of characteristic points to be searched in this Example is every pairing combination of characteristic points. The search range may be narrowed when, for example, the upper limit to the parallel shift amount of an image is known in advance by searching within the range of the upper limit. Narrowing the search range in this manner can reduce the processing amount.

The standard by which the set selecting unit 120 selects a set in this Example is that the element count is 2 or more. The set selecting unit 120 may select a set that has a given element count or more as in this example, or may use other selection standards. For instance, the set selecting unit 120 may select a given value of sets in descending order of element count, or may select a set whose element count is equal to or more than a given proportion of the highest element count of all sets. Similarly, sets having higher element counts may be selected until the count of elements contained in the selected sets reaches a given ratio to the total count of elements of all sets. Alternatively, an element count to be used as the selection standard may be determined based on the size or pixel count of an input image, the amount of calculation required in creating sets of characteristic point pairs, or the like.

The set selecting unit 120 may also combine characteristic point pair sets whose local conversion parameters are close to each other into one set, to thereby prevent the dispersion of correct corresponding characteristic points among a plurality of sets and the resultant low element count in each set. The set selecting unit 120 in this case may operate to perform processing of grouping corresponding characteristic points by which subject is drawn through individual recognition by way of an existing pattern recognition technology.

The corresponding characteristic point determining unit 130 in this Example determines all characteristic point pairs contained in selected sets as corresponding characteristic point pairs. In the case where the standard for determining that local conversion parameters are close to each other is that the local conversion parameters have a difference from each other within a given range, instead of being a complete match, local conversion parameters of individual elements in selected sets have various values. Precision improving processing may be executed that uses these differences in local conversion parameter to reduce wrong corresponding characteristic points. For instance, wrong correspondence can be reduced by obtaining an average for a set and removing a characteristic point pair that deviates greatly from the average. The barycenter of a set may also be used in determining characteristic point pairs to be excluded.

Example 2 of this invention is described next. This Example corresponds to the second embodiment of this invention.

This Example is the application of this invention to a characteristic point associating system in a system that performs individual recognition on fruits.

The system discussed here is an individual recognition system for melons which aims to secure traceability in order to address the falsification of fruit production area and other problems. The pattern of a melon registered by a grower and the pattern of a melon that is sold are compared and, when the patterns match, the melons are determined as the same individual. Individual recognition of melons is therefore accomplished by extracting characteristic points from the pattern of a melon, and associating characteristic points for cross-checking, and falsification of production area or the like can be found out. Characteristic points of a melon pattern, which can be extracted by various commonly known methods, have already been extracted here. The characteristic point cross-checking technology for determining whether or not subjects are the same based on the association between characteristic points is also a widely known technology, and only the process up through the association of characteristic points is described here, while a description on processing that precedes and follows the process is omitted.

Figure 10:
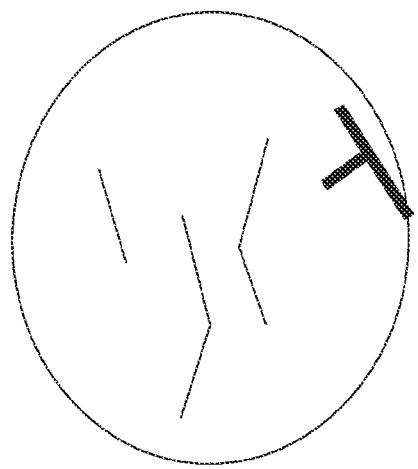
FIG. 10 is a schematic view illustrating one of processing target images to be compared according to Example 2 of this invention.
Figure 11:
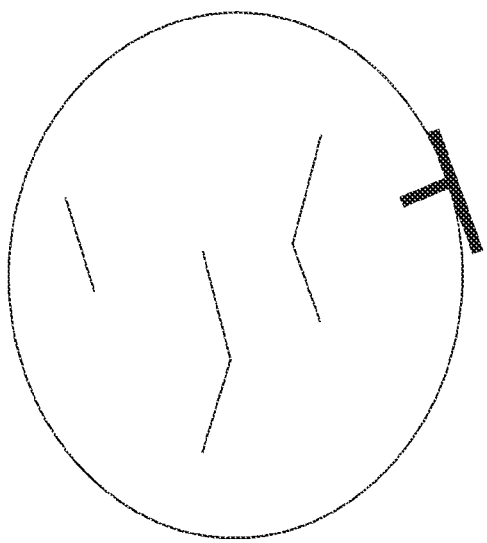
FIG. 11 is a schematic view illustrating the other processing target image to be compared according to Example 2 of this invention.
Figure 12:
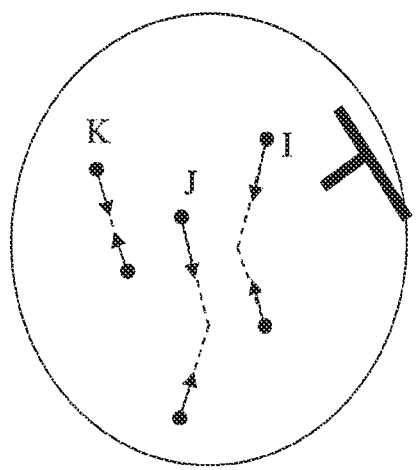
FIG. 12 is an explanatory diagram illustrating characteristic points of the processing target image of FIG. 10.
Figure 13:
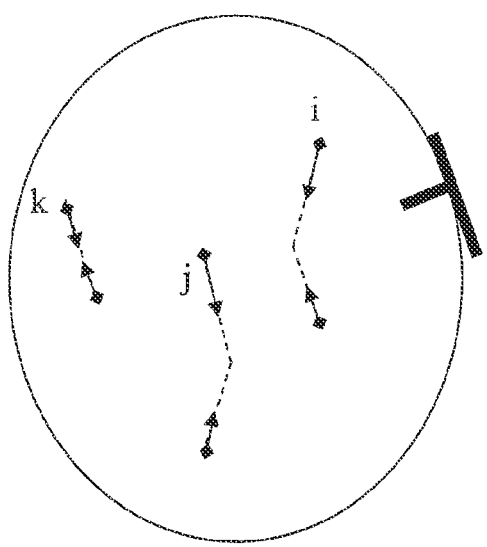
FIG. 13 is an explanatory diagram illustrating characteristic points of the processing target image of FIG. 11.

FIGS. 10 and 11 are schematic views each illustrating the pattern of a melon. Breaks in the linear pattern are treated as characteristic points in this Example as illustrated in FIGS. 12 and 13. The characteristics amount of a characteristic point includes, as elements, not only the coordinate position but also the direction of a line with which the characteristic point is in contact. The characteristics amount may also include the difference from ambient brightness or the like as an element.

Figure 14:
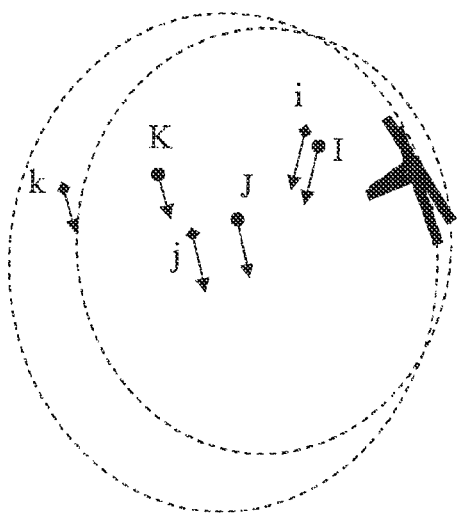
FIG. 14 is an explanatory diagram illustrating a positional relation between the characteristic points of FIG. 12 and the characteristic points of FIG. 13.

Comparison processing is performed on FIG. 12, which illustrates characteristic points of the melon of FIG. 10, and FIG. 13, which illustrates characteristic points of the melon of FIG. 11. FIG. 14 is a diagram in which two characteristic point arrangement patterns are overlapped with the stems of the melons as the center. The melon in FIG. 10 and the melon in FIG. 12 are placed differently, which results in a difference in characteristic point arrangement. The difference in the placement of the melons causes, for example, a great difference between the relative positional relation of "I" and "K" and the relative positional relation of i and k despite the fact that "I" and "i" "J" and "j", and "K" and "k" are each identical characteristic points. The identity of two images between which the arrangement of pattern characteristic points differs partially and locally like this is determined by obtaining correct characteristic point pairs.

The Example 2 is described by using the example of these two images.

The set creating unit 210 selects, as a focus characteristic point pair, one of pairing combinations of characteristic points from the two images (corresponds to S201 of FIG. 4). Here, (I, i) is selected as a focus characteristic point pair.

A local conversion parameter is obtained next for the selected focus characteristic point pair, and a characteristic point pair set that contains only the focus characteristic point pair as its element is created (correspond to S202 and S203). Here, a set 10 which has (I, i) as an element is created.

Processing on proximate characteristic point pairs of the focus characteristic point pair is performed next (corresponds to S204 to S208). Proximate characteristic point pairs are created first by separately selecting characteristic points from the vicinity of the focus characteristic point pair. Here, proximate characteristic points of "I" are "J" and "K", proximate characteristic points of "i" are "j" and "k", and four proximate characteristic point pairs, (J, j), (J, k), (K, j), and (K, k) are considered. Thereafter, local conversion parameters are obtained for the selected proximate characteristic point pairs, and are added to the characteristic point pair set that contains the focus characteristic point pair as an element, based on the closeness of the obtained local conversion parameters to the local conversion parameter of the focus characteristic point pair.

Figure 15:
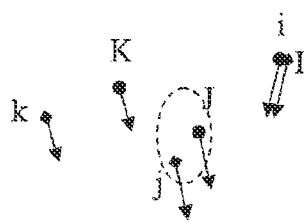
FIG. 15 is an explanatory diagram illustrating an example of a relative positional relation between characteristic points according to Example 2 of this invention.

FIG. 15 illustrates the relative positional relation of proximate characteristic points relative to the focus characteristic point pair (I, i). Of the proximate characteristic point pairs (J, j), (J, k), (K, j), and (K, k), (J, j) has a close relative positional relation, and is added here to the set 10.

Next, in the case where the set containing the focus characteristic point pair contains characteristic point pairs that have not been selected as a focus characteristic point pair yet, one of the characteristic point pairs that have not been selected as a focus characteristic point pair is selected as a new focus characteristic point pair, and the processing on proximate characteristic point pairs is performed.

For instance, the set 10 containing the focus characteristic point pair (I, i) contains (J, j) which has not been selected as a focus characteristic point pair, and the processing of proximate characteristic point pairs is performed with (J, j) as the focus characteristic point pair.

Here, proximate characteristic points of "J" are "I" and "K", and proximate characteristic points of "j" are "i" and "k". Although (J, j) has four proximate characteristic point pairs, (I, i), (I, k), (K, i), and (K, k), (I, i) already belongs to the set 10, and (I, k), (K, i), and (K, k) which do not belong to any set yet are therefore considered.

Figure 16:
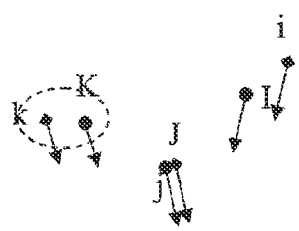
FIG. 16 is an explanatory diagram illustrating another example of the relative positional relation between characteristic points according to Example 2 of this invention.

FIG. 16 illustrates the relative positional relation of proximate characteristic points relative to the focus characteristic point pair (J, j). Of the proximate characteristic point pairs searched, namely, (I, k), (K, i), and (K, k), (K, k) has a close relative positional relation and is added to the set 10.

The characteristic point pair (K, k) which belongs to the set 10 and which has not been selected as a focus characteristic point pair yet is next selected as the focus characteristic point pair to perform the processing of proximate characteristic point pairs. The set creating unit 210 repeats the operation in this manner until the set 10 no longer contains a characteristic point pair that has not been selected as a focus characteristic point pair.

When the focus set no longer contains a characteristic point pair that has not been selected as a focus characteristic point pair, the next set is selected.

In this manner, when there is a characteristic point pair that has not been selected yet, the same processing is executed with this characteristic point pair as a new focus characteristic point. The processing described above is repeated until every characteristic point pair is processed.

The subsequent operation of the set selecting unit 220 and the corresponding characteristic point determining unit 230 is the same as in Example 1, and a description thereof is omitted.

The characteristics amount of a characteristic point in this Example uses direction in addition to position as parameter elements. Even in cases where a target characteristic point does not have direction for example, when the dot pattern of a mandarin orange or a pear is used as a characteristic point, the directional characteristics amount can be given to a characteristic point by an arbitrary method such as a method in which a direction toward a characteristic point closest to a characteristic point in question is used as the direction that the characteristic point in question has, or a method in which a reference point such as the stem of the mandarin orange or the pear is determined and a direction toward the reference point is used.

This Example has described the application of this invention to a characteristic point associating system in an individual recognition system for fruits by taking a melon as an example. However, this invention is also applicable to an individual recognition system for fresh fish or the like that is targeted for a subject whose contour and pattern directionality can be used, such as fish, and that utilizes the pattern directionality relative to the contour as the characteristics amount of a characteristic point. This invention can also be applied to a fingerprint or palm print authentication system in which breaks or branches in a ridge are associated as characteristic points for cross-checking, a character recognition system which recognizes a character by using end points and high curvature points of a character, and any other system that requires associating characteristic points from two images with each other.

Fingers and palms which are stretchable expand/contract partially. The feature of this invention which is the capability of dealing with cases where a local conversion parameter differs partially is therefore effective when this invention is applied to a fingerprint or palm print authentication system.

Similarly, fruits and other perishables change with time in color and pattern. The feature of this invention which is the capability of dealing with cases where a local conversion parameter differs partially is therefore effective when this invention is applied to an individual recognition system that absorbs the difference in amount of change from one site to another due to a change with time of a recognition target. In this case, the closeness/distantness between parameters in the extraction of characteristic point pair sets may be adjusted based on the date/time of image obtainment, transport information of the recognition target, and the like.

Also in character recognition the space between characters or the space between the left-hand radical and the right-hand radical within one Chinese character changes sometimes, and the feature of this invention which is the capability of dealing with cases where a local conversion parameter differs partially is therefore effective when this invention is applied to a character recognition system.

Effects of Example 2 are described next. Example 1 uses the absolute difference in local conversion parameter in determining to which set a characteristic point pair belongs. Example 1 is therefore incapable of dealing with cases where a characteristic point on a sphere such as a melon given as an example in this Example changes gradually with the rotation of the sphere. For instance, the characteristic point K and the characteristic point k the absolute distance between which is fairly great in FIG. 14 are hardly recognized as a characteristic point pair that belongs to the same set as the characteristic point pair (I, i) with the method of Example 1. In this Example, where the relative positional relation relative to an adjacent characteristic point pair is used as illustrated in FIGS. 15 and 16, (K, k) can be put in the same set 10 as (J, j) namely, the same set 10 as (I, j), by determining from the relative positional relation relative to (J, j), which is closer to (K, k) than (I, i) is.

Example 2 is thus also capable of dealing with cases where the positional relation or the like within an image changes partially and little by little.

The components of the characteristic point associating system can be implemented by a combination of hardware and software. In a mode where hardware and software are combined, a characteristic point associating program is developed onto a RAM and the components function as various means by operating the hardware of a control unit (CPU) or the like based on the program. This program may also be recorded fixedly on a recording medium to be distributed. The program recorded on the recording medium is read onto a memory via a cable, wireless connection, or the recording medium itself, and runs the control unit and others. Examples of the recording medium include optical discs, magnetic disks, semiconductor memory devices, and hard disks.

Figure 17:
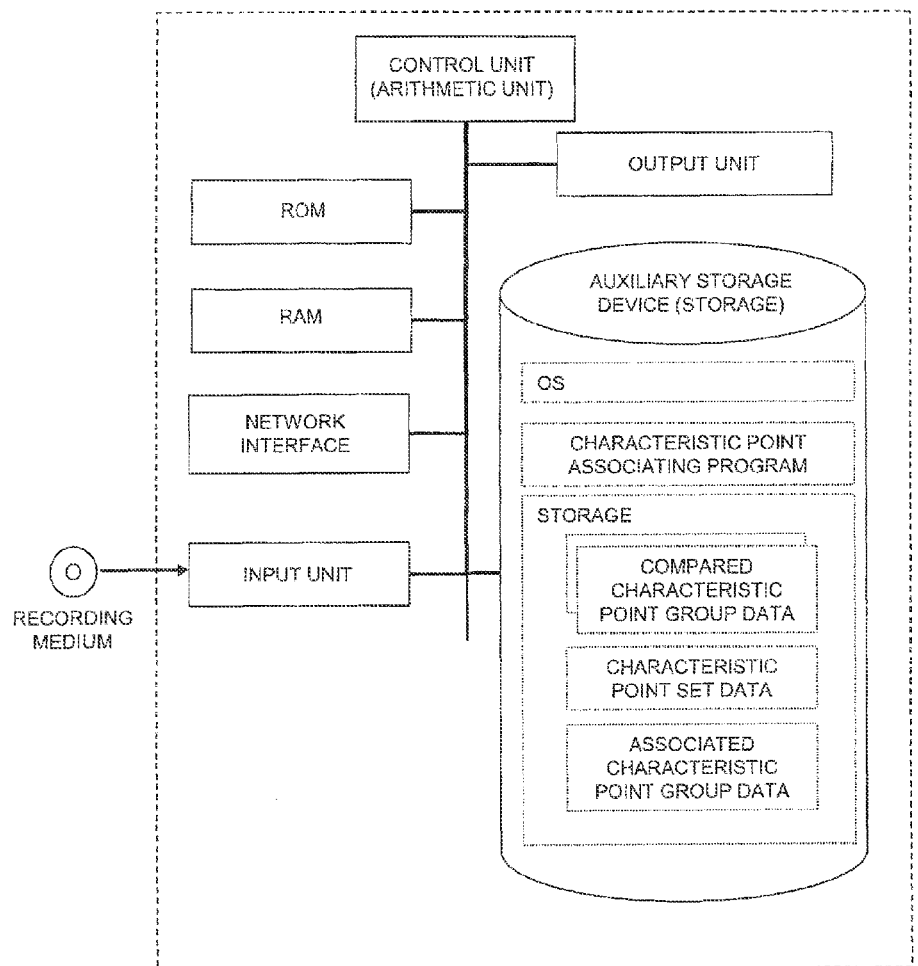
FIG. 17 is a configuration diagram illustrating an example of embodying this invention.

The characteristic point associating system may be built on a single computer or server as exemplified in FIG. 17, and may also be built as a cloud system.

To rephrase this embodiment, an information processing device to operate as a characteristic point associating system can be implemented by operating a control unit as set creating means, set selecting means, and corresponding characteristic point determining means, based on a characteristic point associating program developed onto a RAM.

This characteristic point associating system can be used in building an individual recognition system in which characteristic points are extracted separately from two input images as characteristic point groups, a characteristic point contained in one of the extracted characteristic point groups and a characteristic point contained in the other extracted characteristic point group are paired with each other to be recognized as a characteristic point pair, a parameter required for conversion between the characteristic points that constitute the recognized characteristic point pair is obtained as a local conversion parameter, characteristic point pairs that are regarded under a given rule as close to one another in terms of local conversion parameter obtained are grouped to create a plurality of characteristic point pair sets, a characteristic point pair set that is regarded under a given rule as containing many elements is selected from among the plurality of characteristic point pair sets created, characteristic point pairs having local conversion parameters that are regarded under a given rule as characteristic point pairs to remain included are selected, as correct corresponding characteristic points, from among characteristic point pairs that are contained in the selected characteristic point pair set, characteristic point cross-checking processing is performed with the use of the corresponding characteristic point pairs selected, and the identity of individuals included in the input two images is determined. The characteristic point associating system can also be used in building a 3D map creating system in which 3D map creating processing is performed to create a 3D map of subjects included in two input images.

Other than the association between images, the characteristic point associating system can be used in associating an image with data of a characteristic point group. Data of a characteristic point group here is data obtained by turning a positional relation between characteristic points in a specific space into information.

By comparing an image and data of a characteristic point group in this manner, an actually shot satellite image, aerial image, or the like can be associated with existing map data at a small processing amount. For instance, incorporating this characteristic point associating system in a shooting position identifying system enables the identifying system to extract, from input images, the position and name of a subject of the images, relevant data of the subject, 3D data, and the like.

The characteristic point associating system can also be used when associating an image and a video, a video and another video, a video and data of a characteristic point group, and the like in real time.

By associating characteristic points from different characteristic point groups in real time in this manner, a video shot with a camera or the like and map data or the like can be associated with each other at a small processing amount. These can be utilized in, for example, a car navigation system and an Augmented Reality (AR) system. Processing such as overwriting on a video shot with a camera and outputting annotation is thus accomplished at a small processing amount. In the case of a video-video comparison, the system can be used in identifying a copyright holder or the like. In the case of real time processing as in a car navigation system or an AR system, the overall processing amount can be reduced by performing processing involving newly extracting a characteristic point from a video shot with a camera, pairing the extracted characteristic point with a characteristic point that is contained in data (characteristic point group) to be compared, recognizing the paired characteristic points as a characteristic point pair, obtaining a local conversion parameter for the characteristic point pair, finding one of already obtained local conversion parameters of characteristic point pair sets that is close to the local conversion parameter of the characteristic point pair, and adding the characteristic point pair to the characteristic point pair set that has the close local conversion parameter. The extraction range in this case may be limited based on the relation with characteristic point pairs that are in the vicinity of the newly extracted characteristic point.

The car navigation system or the AR system may associate characteristic points from different characteristic point groups for each frame of a real time processing image, or may perform the processing while thinning out frames. This invention may also be used to associate characteristic points from different characteristic point groups with each other in association with one frame and another frame that are separated by a given interval, and with a specific amount of change, and characteristic points of an intervening frame between the flames are associated with characteristic points that are closer to one of the frames used in the association. In the case of MPEG or other video formats where inter-frame prediction is executed, I frames or other frames where inter-frame prediction is not executed may be used to group together pairs of characteristic points from different characteristic point groups that are close to one another in terms of local conversion parameter and to process the grouped characteristic point pairs, whereas a value calculated in inter-frame prediction of frames where inter-frame prediction is executed may be used to correct the prediction of the corresponding characteristic points obtained from the frames where inter-frame prediction is not executed.

This way, information such as the position of a subject and a change in the subject (e.g., a vehicle driving alongside) can be obtained at a small processing amount. The feature of this invention which is the capability of dealing with cases where a local conversion parameter differs partially as described in the embodiments is also effective in absorbing a difference that is caused by the weather, a light source, or the like between extracted characteristic points of a recognition target of real time processing from a video. The thinning and other types of processing described may be performed by the set creating means. The frame association between compared frames may be handled by the corresponding characteristic point determining unit.

As has been described, a characteristic point associating system to which this invention is applied is capable of associating characteristic points at a small processing amount also for two images or the like in which the arrangement partially differs.

That is, according to one embodiment of this invention, it is possible to provide the characteristic point associating system that is capable of associating the characteristic points with each other at a low processing amount even when the arrangement of a subject partially differs between compared groups of characteristic points such as two images.

The concrete configuration of this invention is not limited to Embodiments and Examples described above, and modifications that do not depart from the spirit of this invention are encompassed in this invention. This invention also includes suitable dividing and combining of the components.

Some or all of the embodiments described above can also be expressed as follows. The following notes in no way limit this invention.

[Supplementary Note 1]

A characteristic point associating system, including:

a set creating unit to receive a plurality of characteristic point groups to be compared, and to create a plurality of characteristic point pair sets by grouping together characteristic point pairs that are close to one another in terms of local conversion parameter into sets;

a set selecting unit to select a characteristic point pair set that contains many elements out of the plurality of characteristic point pair sets; and a corresponding characteristic point determining unit to determine out of characteristic point pairs contained in the selected characteristic point pair set, a pair of characteristic points to be associated with each other as correct corresponding characteristic points so as to be input.

[Supplementary Note 2]

A characteristic point associating system according to the foregoing note, in which the set creating unit refers to the local conversion parameter of a given characteristic point pair and the local conversion parameters of proximate characteristic point pairs, which are in the vicinity of the given characteristic point pair, to thereby create the characteristic point pair sets which group together characteristic point pairs that are close to one another in terms of the local conversion parameter.

[Supplementary Note 3]

A characteristic point associating system according to the foregoing note, in which, when creating the sets, in order to determine whether to add a specific characteristic point pair to an already created set, the set creating unit creates proximate characteristic point pairs for the specific characteristic point pair by selecting, as proximate characteristic points, characteristic points that belong to a search range based on a relative positional relation relative to a characteristic point pair that is contained in the existing set.

[Supplementary Note 4]

A characteristic point associating system according to any one of the foregoing notes, in which the set creating unit uses, as the local conversion parameter, a value required for conversion between characteristic points paired as a characteristic point pair to create a characteristic point pair set which groups together characteristic point pairs that are close to one another in terms of parameter.

[Supplementary Note 5]

A characteristic point associating system according to the foregoing note, in which local conversion parameter includes a plurality of parameter elements required for local conversion, and the set creating unit creates a characteristic point pair set which groups together characteristic point pairs based on approximation property of each of the plurality of parameter elements.

[Supplementary Note 6]

A characteristic point associating system according to any one of the foregoing notes, in which the set creating unit performs processing of grouping characteristic point pairs by setting a standard to determine that the local conversion parameter is close to a local conversion parameter of an already created set as "the local conversion parameters completely match," or "a difference between the local conversion parameters is within a given range," and the standard uses a parameter of an element selected first, a parameter averaged among elements that are contained in the set, and a parameter of barycenter of the elements that are contained in the set.

[Supplementary Note 7]

A characteristic point associating system according to any one of the foregoing notes, in which, in a set that uses a standard other than "complete match" as a range in which local conversion parameters are regarded as close to one another when characteristic point pairs are grouped, the corresponding characteristic point determining unit compares a local conversion parameter of each characteristic point pair that is contained as an element in a characteristic point pair set selected by the set selecting unit, against any one of a parameter of an element selected first, a parameter averaged among elements that are contained in the set, and a parameter of barycenter of the elements that are contained in the set, and excludes a characteristic point pair whose local conversion parameter deviates greatly from association as wrong corresponding characteristic points.

[Supplementary Note 8]

An individual recognition system, the individual recognition system being configured to:

extract characteristic points respectively from two input images as characteristic point groups;

pair a characteristic point that is contained in one of the extracted characteristic point groups and a characteristic point that is contained in another of the extracted characteristic point groups with each other and recognize the paired characteristic points as a characteristic point pair, obtain a parameter required for conversion between the characteristic points that constitute the recognized characteristic point pair as a local conversion parameter, and create a plurality of characteristic point pair sets by grouping together characteristic point pairs that are regarded under a given rule as being close to one another in terms of local conversion parameters obtained;

select a characteristic point pair set that is regarded under a given rule as containing a high count of elements out of the plurality of characteristic point pair sets created;

select, from among characteristic point pairs that are contained in the selected characteristic point pair set, a characteristic point pair having a local conversion parameter that is regarded under a given rule as a characteristic point pair to remain included as correct corresponding characteristic points; and determine identity of individuals included in the two input images by performing characteristic point cross-checking processing with use of the selected pair of corresponding characteristic points.

[Supplementary Note 9]

A characteristic point associating method, including:

a set creating step of receiving a plurality of characteristic point groups to be compared, and creating a plurality of characteristic point pair sets by grouping together characteristic point pairs that are close to one another in terms of local conversion parameter into sets;

a set selecting step of selecting a characteristic point pair set that contains many elements out of the plurality of characteristic point pair sets; and a corresponding characteristic point determining step of determining, out of characteristic point pairs contained in the selected characteristic point pair set, a pair of characteristic points to be associated with each other as correct corresponding characteristic points so as to be output.

[Supplementary Note 10]

A characteristic point associating method according to the foregoing note, in which the set creating step includes referring to the local conversion parameter of a given characteristic point pair and the local conversion parameters of proximate characteristic point pairs, which are in the vicinity of the given characteristic point pair, to thereby create characteristic point pair sets which group together characteristic point pairs that are close to one another in terms of local conversion parameter.

[Supplementary Note 11]

A characteristic point associating method according to the foregoing note, in which the set creating step includes creating, when creating the sets, in order to determine whether to add a specific characteristic point pair to an already created set, proximate characteristic point pairs for the specific characteristic point pair by selecting, as proximate characteristic points, characteristic points that belong to a search range based on a relative positional relation relative to a characteristic point pair that is contained in the existing set.

[Supplementary Note 12]

A characteristic point associating method according to any one of the foregoing notes, in which the set creating step includes using, as the local conversion parameter, a value required for conversion between characteristic points paired as a characteristic point pair to create a characteristic point pair set which groups together characteristic point pairs that are close to one another in terms of parameter.

[Supplementary Note 13]

A characteristic point associating method according to the foregoing note, in which the local conversion parameter includes a plurality of parameter elements required for local conversion, and the set creating step includes creating a characteristic point pair set which groups together characteristic point pairs based on approximation property of each of the plurality of parameter elements.

[Supplementary Note 14]

A characteristic point associating method according to any one of the foregoing notes, in which the set creating step includes performing processing of grouping characteristic point pairs by setting a standard to determines that the local conversion parameter is close to a local conversion parameter of an already created set as "the local conversion parameters completely match," or "a difference between the local conversion parameters is within a given range," and the standard uses a parameter of an element selected first, a parameter averaged among elements that are contained in the set, and a parameter of barycenter of the elements that are contained in the set.

[Supplementary Note 15]

A characteristic point associating method according to any one of the foregoing notes, in which the corresponding characteristic point determining step includes comparing, in a set that uses a standard other than a "complete match" as a range in which local conversion parameters are regarded as close to one another when characteristic point pairs are grouped, a local conversion parameter of each characteristic point pair that is contained as an element in a characteristic point pair set selected in the set selecting step, against any one of a parameter of an element selected first, a parameter averaged among elements that are contained in the set, and a parameter of barycenter of the elements that are contained in the set, and excluding a characteristic point pair whose local conversion parameter deviates greatly front association as wrong corresponding characteristic points.

[Supplementary Note 16]

A characteristic point associating program to control a control unit of an information processing device so that the control unit operates as:

a set creating unit to create a plurality of characteristic point pair sets by group together characteristic point pairs that are close to one another in terms of local conversion parameter;

a set selecting unit t select a characteristic point pair set that contains many elements out of the plurality of characteristic point pair sets; and a corresponding characteristic point determining unit to determine out of characteristic point pairs contained in the selected characteristic point pair set, a pair of characteristic points to be associated with each other as correct corresponding characteristic points so as to be output.

[Supplementary Note 17]

A characteristic point associating program according to the foregoing note, in which the set creating unit is controlled by the characteristic point associating program so as to refer to the local conversion parameter of a given characteristic point pair and the local conversion parameters of proximate characteristic point pairs, which are in the vicinity of the given characteristic point pair, to thereby create the characteristic point pair sets which group together characteristic point pairs that are close to one another in terms of the local conversion parameter.

[Supplementary Note 18]

A characteristic point associating program according to the foregoing note, in which the set creating unit is controlled by the characteristic point associating program so as to create, when creating the sets, in order to determine whether to add a specific characteristic point pair to an already created set, proximate characteristic point pairs for the specific characteristic point pair by selecting, as proximate characteristic points, characteristic points that belong to a search range based on a relative positional relation relative to a characteristic point pair that is contained in the existing set.

[Supplementary Note 19]

A characteristic point associating program according to any one of the foregoing notes, in which the set creating unit is controlled by the characteristic point associating program so as to use, as the local conversion parameter, a value required for conversion between characteristic points paired as a characteristic point pair to create a characteristic point pair set which groups together characteristic point pairs that are close to one another in terms of parameter.

[Supplementary Note 20]

A characteristic point associating program according to the foregoing note, in which the local conversion parameter includes a plurality of parameter elements required for local conversion, and the set creating unit is controlled by the characteristic point associating program so as to create a characteristic point pair set which groups together characteristic point pairs based on approximation property of each of the plurality of parameter elements.

[Supplementary Note 21]

A characteristic point associating program according to any one of the foregoing notes, in which the set creating unit is controlled by the characteristic point associating program so as to perform processing of grouping characteristic point pairs by setting a standard to determine that the local conversion parameter is close to a local conversion parameter of an already created set as "the local conversion parameters completely match," or "a difference between the local conversion parameters is within a given range," and the standard uses a parameter of an element selected first, a parameter averaged among elements that are contained in the set, and a parameter of barycenter of the elements that are contained in the set.

[Supplementary Note 22]

A characteristic point associating program according to any one of the foregoing notes, in which the corresponding characteristic point determining unit is controlled by the characteristic point associating program so as to compare, in a set that uses a standard other than a "complete match" as a range in which local conversion parameters are regarded as close to one another when characteristic point pairs are grouped, a local conversion parameter of each characteristic point pair that is contained as an element in a characteristic point pair set selected by the set selecting unit, against any one of a parameter of an element selected first, a parameter averaged among elements that are contained in the set, and a parameter of barycenter of the elements that are contained in the set, and to exclude a characteristic point pair whose local conversion parameter deviates greatly from association as wrong corresponding characteristic points.

[Supplementary Note 23]

A characteristic point associating program according to one of the foregoing notes, in which the set creating unit is controlled by the characteristic point associating program so as to:

receive a group of characteristic points that are extracted from frames of a video or image obtained in real time from a camera, pair a characteristic point that is included in the group of extracted frame characteristic points with a characteristic point that is contained in a prepared characteristic point group, recognize the paired characteristic points as a characteristic point pair, obtain, as a local conversion parameter, a parameter required for conversion between the characteristic points that constitute the recognized characteristic point pair, group together characteristic point pairs that are regarded under a given rule as being close to one another in terms of local conversion parameters obtained, and create a plurality of characteristic point pair sets from the grouped characteristic point pairs; and execute characteristic point cross-checking processing to output annotation overwritten on the video from the camera, based on the received frame characteristic point group.

[Supplementary Note 24]

A characteristic point associating program according to one of the foregoing notes, in which the set creating unit is controlled by the characteristic point associating program so as to thin out the frame characteristic point group.

[Supplementary Note 25]

A characteristic point associating program according to one of the foregoing notes, in which the set creating unit is controlled by the characteristic point associating program so as to create a plurality of characteristic point sets by grouping together characteristic point pairs that are close to one another in terms of local conversion parameter, in association with each frame of a given interval and/or each specific amount of change.

[Supplementary Note 26]

A characteristic point associating program according to one of the foregoing notes, in which the corresponding characteristic point determining unit is controlled by the characteristic point associating program so as to associate characteristic points of a frame that has not been used in the generation of the characteristic point sets with characteristic points that are closer to one of the frames used in the association.

[Supplementary Note 27]

A characteristic point associating program according to one of the foregoing notes, in which the corresponding characteristic point determining unit is controlled by the characteristic point associating program so as to calculate, for characteristic points of a frame that has not been used in the generation of the characteristic point sets, corresponding characteristic points or corresponding positions in a characteristic point group to be compared which correspond to the characteristic points of the frame in question, based on a relation between the frame in question and a frame used in the association, and characteristic point pairs of the frame used in the association.

[Supplementary Note 28]

A recording medium having recorded thereon a characteristic point associating program of one of the foregoing notes.

This invention can be applied to any system that needs to associate characteristic point from two images or the like with each other.

This application claims priority from Japanese Patent Application No. 2011-178029, filed on Aug. 16, 2011, the entire disclosure of which is incorporated herein.

REFERENCE SIGNS LIST 110, 210 set creating unit (set creating means)
120, 220 set selecting unit (set selecting means)
130, 230 corresponding characteristic point determining unit (corresponding characteristic point determining means)

The invention claimed is:

1. A characteristic point associating system, comprising:
one or more program memories for storing program instructions;
a characteristic point memory for storing characteristic point groups; and
one or more processors for executing program instructions from the one or more program memories, wherein the program instructions configure the one or more processors to:
receive a plurality of characteristic point groups from the characteristic point memory to be compared;
output a pair of characteristic points to be associated with each other as correct corresponding characteristic points;
obtain characteristic point pairs that are selected from the plurality of characteristic point groups;
create a plurality of characteristic point pair sets by grouping the characteristic point pairs that are close to one another using local conversion parameters;
select a characteristic point pair set out of the plurality of created characteristic point pair sets with reference to the local conversion parameters; and
determine out of characteristic point pairs contained in the selected characteristic point pair set, the pair of characteristic points to be associated with each other as correct corresponding characteristic points so as to be output.

2. The characteristic point associating system according to claim 1, wherein the one or more processors refer to the local conversion parameter of a given characteristic point pair and the local conversion parameters of proximate characteristic point pairs, which are in the vicinity of the given characteristic point pair, to thereby create the characteristic point pair sets which group together the characteristic point pairs that are close to one another in terms of the local conversion parameter.

3. The characteristic point associating system according to claim 2, wherein, when creating the characteristic point pair sets, in order to determine whether to add a specific characteristic point pair to an already created set, the one or more processors create proximate characteristic point pairs for the specific characteristic point pair by selecting, as proximate characteristic points, characteristic points that belong to a search range based on a relative positional relation relative to a characteristic point pair that is contained in the existing set.

4. The characteristic point associating system according to claim 1, wherein the one or more processors use, as the local conversion parameter, a value required for conversion between characteristic points paired as a characteristic point pair to create a characteristic point pair set which groups together characteristic point pairs that are close to one another in terms of the local conversion parameter.

5. The characteristic point associating system according to claim 1, wherein the local conversion parameter comprises a plurality of parameter elements required for local conversion, and the one or more processors create a characteristic point pair set which groups together characteristic point pairs based on approximation property of each of the plurality of parameter elements.

6. The characteristic point associating system according to claim 1, wherein the one or more processors perform processing of grouping characteristic point pairs by setting a standard for determining that the local conversion parameter is close to a local conversion parameter of an already created set as the local conversion parameters completely match, or a difference between the local conversion parameters is within a given range, and the standard uses a parameter of an element selected first, a parameter averaged among elements that are contained in the set, and a parameter of barycenter of the elements that are contained in the set.

7. The characteristic point associating system according to claim 1, wherein, in a set that uses a standard other than a complete match as a range in which local conversion parameters are regarded as close to one another when characteristic point pairs are grouped, the one or more processors compare a local conversion parameter of each characteristic point pair that is contained as an element in a selected characteristic point pair set, against any one of a parameter of an element selected first, a parameter averaged among elements that are contained in the set, and a parameter of barycenter of the elements that are contained in the set, and exclude a characteristic point pair whose local conversion parameter deviates greatly from association as wrong corresponding characteristic points.

8. The characteristic point associating system according to claim 1, wherein the program instructions further configure the one or more processors to:
   extract characteristic points respectively from two input images as the characteristic point groups; and
   determine that individual objects included in the two input images are the same object by performing characteristic point cross-checking processing with use of the selected pair of corresponding characteristic points.

9. A characteristic point associating method comprising:
   receiving, by a processor from an input interface of the processor, a plurality of characteristic point groups to be compared,
   obtaining, by the processor, characteristic point pairs that are selected from the characteristic point groups to be compared,
   creating, by the processor, a plurality of characteristic point pair sets by grouping the characteristic point pairs that are close to one another using local conversion parameters of the respective point pairs;
   selecting, by the processor, a characteristic point pair set out of the created plurality of characteristic point pair sets based on the local conversion parameters; and
   determining, by the processor, out of characteristic point pairs contained in the selected characteristic point pair set, the pair data of the characteristic points to be associated with each other as correct corresponding characteristic points data so as to be output to an output interface of the processor.

10. The characteristic point associating method according to claim 9, wherein the set creating step includes referring to the local conversion parameter of a given characteristic point pair and the local conversion parameters of proximate characteristic point pairs, which are in the vicinity of the given characteristic point pair, to thereby create the characteristic point pair sets which group together characteristic point pairs that are close to one another in terms of the local conversion parameter.

11. The characteristic point associating method according to claim 9, wherein the characteristic point pair sets creating step includes creating, when creating the sets, in order to determine whether to add a specific characteristic point pair to an already created set, proximate characteristic point pairs for the specific characteristic point pair by selecting, as proximate characteristic points, characteristic points that belong to a search range based on a relative positional relation relative to a characteristic point pair that is contained in the existing set.

12. The characteristic point associating method according to claim 9, wherein the set creating step includes using, as the local conversion parameter, a value required for conversion between characteristic points paired as a characteristic point pair to create a characteristic point pair set which groups together characteristic point pairs that are close to one another in terms of the local conversion parameter.

13. The characteristic point associating method according to claim 9, wherein the local conversion parameter includes a plurality of parameter elements required for local conversion, and the set creating step includes creating a characteristic point pair set which groups together characteristic point pairs based on approximation property of each of the plurality of parameter elements.

14. The characteristic point associating method according to claim 9, wherein the set creating step includes performing processing of grouping characteristic point pairs by setting a standard to determines that the local conversion parameter is close to a local conversion parameter of an already created set as "the local conversion parameters completely match," or "a difference between the local conversion parameters is within a given range," and the standard uses a parameter of an element selected first, a parameter averaged among elements that are contained in the set, and a parameter of barycenter of the elements that are contained in the set.

15. The characteristic point associating method according to claim 9, wherein the corresponding characteristic point determining step includes comparing, in a set that uses a standard other than a complete match as a range in which local conversion parameters are regarded as close to one another when characteristic point pairs are grouped, a local conversion parameter of each characteristic point pair that is contained as an element in a characteristic point pair set selected in the set selecting step, against any one of a parameter of an element selected first, a parameter averaged among elements that are contained in the set, and a parameter of barycenter of the elements that are contained in the set, and excluding a characteristic point pair whose local conversion parameter deviates greatly from association as wrong corresponding characteristic points.

16. A non-transitory computer-readable recording medium having recorded thereon a characteristic point associating program for an information processing device including one or more processors and a memory, wherein the one or more processors:
   receive a plurality of characteristic point groups from the memory;
   output a pair of characteristic points to be associated with each other as correct corresponding characteristic points;
   receive the plurality of characteristic point groups to be compared;
   obtain characteristic point pairs that are selected from the characteristic points to be compared;
   create a plurality of characteristic point pair sets by grouping the characteristic point pairs that are close to one another by the use of local conversion parameters of characteristic point pairs grouped;
   select a characteristic point pair set out of the plurality of created characteristic point pair sets based on the local conversation parameters; and determine out of characteristic point pairs contained in the selected characteristic point pair set, the pair of characteristic points to be associated with each other as correct corresponding characteristic points so as to be output.

17. The non-transitory computer-readable recording medium according to claim 16, wherein characteristic point pair sets are created according to the local conversion parameter of a given characteristic point pair and the local conversion parameters of proximate characteristic point pairs, which are in the vicinity of the given characteristic point pair, to thereby create the characteristic point pair sets which group together characteristic point pairs that are close to one another in terms of the local conversion parameter.

18. The non-transitory computer-readable recording medium according to claim 16, wherein, when creating the characteristic point pair sets, in order to determine whether to add a specific characteristic point pair to an already created set proximate characteristic point pairs for the specific characteristic point pair are selected by determining characteristic points that belong to a search range based on a relative positional relation relative to a characteristic point pair that is contained in the existing set.

19. The non-transitory computer-readable recording medium according to claim 16, wherein the local conversion parameter is a value required for conversion between characteristic points paired as a characteristic point pair and wherein the created characteristic point pair set groups together characteristic point pairs that are close to one another in terms of the local conversion parameter.

20. The non-transitory computer-readable recording medium according to claim 16, wherein the local conversion parameter includes a plurality of parameter elements required for local conversion, and the created characteristic point pair set groups together characteristic point pairs based on approximation property of each of the plurality of parameter elements.

21. A method comprising:
receiving, at a processor input of a processor, a candidate characteristic point group;
receiving, at the processor input of the processor, a comparison characteristic point group;
obtaining, by the processor, a plurality of characteristic point pairs that are each selected by selecting one characteristic point from the candidate characteristic point group and one characteristic point from the comparison characteristic point group;
creating a plurality of characteristic point pair sets by:
calculating a local conversion parameter between a candidate pair of the plurality of characteristic point pairs; and
placing the candidate pair into a point pair set of a plurality of point pair sets based on the local conversion parameter, wherein the point pair set of the plurality of point pair sets is a new point pair set if the local conversion parameter of the candidate pair is not close to a local conversion parameter of any of the point pair sets in the plurality of point pair sets;
selecting a point pair set from the plurality of point pair sets based on the point pairs within the plurality of point pair sets;
determining, out of point pairs contained in the selected point pair set, the point pair data to be treated as correct corresponding characteristic point data; and
outputting the correct corresponding characteristic point data using an output interface of the processor.

22. The method of claim 21, further comprising:
mapping between a first set of graphical data from which the candidate characteristic point group is derived and a second set of graphical data from which the comparison characteristic point group is derived based on the correct corresponding characteristic point data;
creating a visual representation of the second set of graphical data superimposed on the first set of graphical data using the correct corresponding characteristic point data; and
displaying the visual representation on a display system.

23. The method of claim 21, wherein the candidate pair is placed into an existing point pair set of the plurality of point pair sets when the local conversion parameter of the candidate pair is close to the local conversion parameters of the point pairs in the existing point pair set.

24. The method of claim 21, wherein the local conversion parameter is a set of one or more values required for conversion between the first characteristic point and the second characteristic point in a characteristic point pair.

25. The method of claim 21, wherein the local conversion parameter of the candidate pair is close to a local conversion parameter of a point pair set of the plurality of point pair sets when the local conversion parameters completely match.

26. The method of claim 21, wherein the local conversion parameter of the candidate pair is close to a local conversion parameter of a point pair set of the plurality of point pair sets when a difference between the local conversion parameters is less than a predetermined threshold.

27. The method of claim 21, wherein determining if the local conversion parameter of the candidate pair is close to a local conversion parameter of a point pair set of the plurality of point pair sets is done based on a first element in the point pair set.

28. The method of claim 21, wherein determining if the local conversion parameter of the candidate pair is close to a local conversion parameter of a point pair set of the plurality of point pair sets is done based on an average local conversion parameter of elements in the point pair set.

29. The method of claim 21, wherein determining if the local conversion parameter of the candidate pair is close to a local conversion parameter of a point pair set of the plurality of point pair sets is done based on a barycenter of the local conversion parameters of the elements of the point pair set.

30. The method of claim 21, further comprising:
performing characteristic point cross-checking processing using the correct corresponding characteristic point data; and
determining the identity of individual objects included in both a first set of graphical data and a second set of graphical data using results of the characteristic point cross-check processing.

31. A characteristic point associating system, comprising:
one or more program memories for storing program instructions;
a characteristic point memory for storing characteristic point groups; and
one or more processors for executing program instructions from the one or more program memories, wherein the program instructions configure the one or more processors to:
receive, at a processor input of the one or more processors, a candidate characteristic point group;
receive, at the processor input from the characteristic point memory, a comparison characteristic point group;

obtain a plurality of characteristic point pairs that are each selected by selecting one characteristic point from the candidate characteristic point group and one characteristic point from the comparison characteristic point group;

create a plurality of characteristic point pair sets by:
calculating a local conversion parameter between a candidate pair of the plurality of characteristic point pairs;
placing the candidate pair into a point pair set of a plurality of point pair sets based on the local conversion parameter, wherein the point pair set of the plurality of point pair sets is a new point pair set if the local conversion parameter of the candidate pair is not close to a local conversion parameter of any of the point pair sets in the plurality of point pair sets;

select a point pair set from the plurality of point pair sets based on the point pairs within the plurality of point pair sets;

determine, out of point pairs contained in the selected point pair set, the point pair data to be treated as correct corresponding characteristic point data; and output the correct corresponding characteristic point data using an output interface of the processor.

32. The system of claim 31, wherein the program instructions further configure the one or more processors to:
map between a first set of graphical data from which the candidate point pair group is derived and a second set of graphical data from which the comparison point pair group is derived based on the correct corresponding characteristic point data;
create a visual representation of the second set of graphical data superimposed on the first set of graphical data using the correct corresponding characteristic point data; and
display the visual representation on a display system.

33. The system of claim 32, further comprising the display system.

34. The system of claim 31, wherein one or more of the first set of graphical data and the second set of graphical data is received from a video imaging device in real time.

35. The system of claim 31, wherein the candidate pair is placed into an existing point pair set of the plurality of point pair sets when the local conversion parameter of the candidate pair is close to the local conversion parameters of the point pairs in the existing point pair set.

36. The system of claim 31, wherein the local conversion parameter is a set of one or more values required for conversion between the first characteristic point and the second characteristic point in a characteristic point pair.

37. The system of claim 31, wherein the local conversion parameter of the candidate pair is close to a local conversion parameter of a point pair set of the plurality of point pair sets when a difference between the local conversion parameters is less than a predetermined threshold.

38. The system of claim 31, wherein determining if the local conversion parameter of the candidate pair is close to a local conversion parameter of a point pair set of the plurality of point pair sets is done based on an average local conversion parameter of the elements in the point pair set.

39. The system of claim 31, wherein determining if the local conversion parameter of the candidate pair is close to a local conversion parameter of a point pair set of the plurality of point pair sets is done based on a barycenter of the local conversion parameters of the elements of the point pair set.

40. The system of claim 31, wherein the program instructions further configure the one or more processors to:
perform characteristic point cross-checking processing using the correct corresponding characteristic point data; and
determine the identity of individual objects included in both the first set of graphical data and the second set of graphical data using the characteristic point cross-check processing results.

* * * * *